(12) United States Patent
Liu

(10) Patent No.: US 9,116,745 B2
(45) Date of Patent: Aug. 25, 2015

(54) RESOURCE ALLOCATION METHOD AND DEVICE FOR FOREGROUND SWITCH OF J2ME APPLICATION

(75) Inventor: Gang Liu, Shenzhen (CN)

(73) Assignee: ZTE CORPORATION, Guangdong Province (CN)

( * ) Notice: Subject to any disclaimer, the term of this patent is extended or adjusted under 35 U.S.C. 154(b) by 309 days.

(21) Appl. No.: 13/517,358

(22) PCT Filed: Apr. 9, 2010

(86) PCT No.: PCT/CN2010/071668
§ 371 (c)(1),
(2), (4) Date: Jun. 20, 2012

(87) PCT Pub. No.: WO2010/148705
PCT Pub. Date: Dec. 29, 2010

(65) Prior Publication Data
US 2012/0258722 A1   Oct. 11, 2012

(30) Foreign Application Priority Data

Dec. 28, 2009  (CN) .......................... 2009 1 0216898

(51) Int. Cl.
*G06F 9/46* (2006.01)
*G06F 9/50* (2006.01)

(52) U.S. Cl.
CPC .............. *G06F 9/5022* (2013.01); *G06F 9/461* (2013.01); *G06F 9/5027* (2013.01)

(58) Field of Classification Search
None
See application file for complete search history.

(56) References Cited

U.S. PATENT DOCUMENTS

| 6,298,422 | B1 * | 10/2001 | Spilo et al. ..................... 711/154 |
| 6,874,145 | B1 * | 3/2005 | Ye et al. ......................... 718/108 |
| 7,164,857 | B2 * | 1/2007 | Asai et al. ...................... 396/429 |
| 7,886,304 | B1 * | 2/2011 | Blaukopf et al. ............. 719/312 |
| 2003/0005019 | A1 * | 1/2003 | Pabla et al. ....................... 709/1 |
| 2004/0023646 | A1 * | 2/2004 | Inami et al. ................... 455/418 |

(Continued)

FOREIGN PATENT DOCUMENTS

| CN | 1620169 | 5/2005 |
| CN | 1649357 | 8/2005 |
| CN | 1767548 | 5/2006 |

OTHER PUBLICATIONS

International Search Report mailed Oct. 21, 2010.
(Continued)

*Primary Examiner* — Abdullah Al Kawsar
(74) *Attorney, Agent, or Firm* — McClure, Qualey & Rodack, LLP

(57) ABSTRACT

A resource allocation method and a resource allocation device for foreground switch of a J2ME (Java 2 Micro Edition) application are provided in the present invention. A JAVA application program receives a first message from a JAVA virtual machine when switching to background from foreground, wherein the first message carries information indicating that the JAVA application program needs to release partial resources; and the JAVA application program returns a first response message to the JAVA virtual machine so as to realize release of the resources, wherein the first response message carries information of resources to be released and/or information of resources to be reserved for restoring to an executing state. The user experience can be improved and the normal use of local applications can be ensured according to the technical solution provided by the present invention.

17 Claims, 8 Drawing Sheets

(56) References Cited

U.S. PATENT DOCUMENTS

| | | |
|---|---|---|
| 2004/0098724 A1* | 5/2004 | Demsey et al. ............... 718/104 |
| 2005/0026654 A1* | 2/2005 | Perez et al. ............... 455/556.2 |
| 2005/0125701 A1* | 6/2005 | Hensbergen et al. ......... 713/320 |
| 2005/0164688 A1* | 7/2005 | Satake .......................... 455/418 |
| 2006/0080474 A1* | 4/2006 | Horii et al. ....................... 710/8 |
| 2006/0218536 A1* | 9/2006 | Kirilline et al. ............... 717/127 |
| 2007/0038989 A1* | 2/2007 | Newton et al. ............... 717/166 |
| 2007/0198723 A1* | 8/2007 | An et al. ....................... 709/226 |
| 2007/0225022 A1* | 9/2007 | Satake .......................... 455/466 |
| 2008/0085717 A1* | 4/2008 | Chhabra et al. ............... 455/450 |
| 2008/0235662 A1* | 9/2008 | Chen et al. .................... 717/118 |
| 2008/0250415 A1* | 10/2008 | Illikkal et al. .................. 718/103 |
| 2009/0036108 A1* | 2/2009 | Cho ............................... 455/418 |
| 2009/0249415 A1* | 10/2009 | Foote ............................ 725/109 |
| 2010/0005481 A1* | 1/2010 | Lewis et al. .................... 719/320 |
| 2010/0315564 A1* | 12/2010 | Hung et al. .................... 348/739 |
| 2011/0283291 A1* | 11/2011 | Tobe et al. .................... 718/104 |
| 2011/0321047 A1* | 12/2011 | Nguyen et al. ................ 718/100 |

OTHER PUBLICATIONS

English Translation of Abstract of CN1649357.
English Translation of Abstract of CN1620169.
English Translation of Abstract of CN1767548.

\* cited by examiner

RESOURCE ALLOCATION METHOD AND DEVICE FOR FOREGROUND SWITCH OF J2ME APPLICATION

CROSS-REFERENCE TO RELATED APPLICATION

This application is a co-pending application which claims priority to PCT Application No. PCT/CN2010/071668, filed Apr. 9, 2010, entitled "Resources Allocation Method and Device for Foreground Switch of Java 2 Platform Micro Edition (J2ME) Application" herein incorporated by reference in its entirety. This application also claims priority to, and the benefit of, Chinese patent application 200910216898.5, filed Dec. 28, 2009, herein incorporated by reference in its entirety.

FIELD OF THE INVENTION

The present invention relates to communication field, and in particular to a resource allocation method and a resource allocation device for foreground switch of a JAVA2 Platform Micro Edition (referred to as J2ME) application.

BACKGROUND OF THE INVENTION

It can be considered that there are a great variety of terminal products (such as mobile phones) in the current market, and the differences and segmentation of their functions, performance and so on are greater and greater, in addition to the differences of overall dimensions, manufacturers, chips, operating systems, and wireless transmission standards. With the development and expansion of the domestic 3G network and the popularity of mobile phones, the differences between various mobile phones are further expanded. At the same time, it is required by operators that the mobile phones as much as possible have more common functions besides calls, short messages and so on, so as to promote more new businesses in a better way. In this case, the function of supporting JAVA virtual machines is quite important, and it becomes the mandatory requirement of many main operators that the mobile phones are based on the JAVA virtual machines with embedded platforms.

The main function of JAVA virtual machines is to provide a Java 2 Micro Edition (J2ME) application environment for the mobile phones, and the mobile phone users can download, install, run and manage the J2ME application programs by means of wireless network, and so on. At the same time, the preset JAVA applications required by the operators can be preset on the mobile phones. The same JAVA application programs can be used on various mobile phones with the support by the JAVA virtual machines, and thereby the differences between mobile phones are reduced. If the mobile phones have JAVA virtual machines, the operators can develop new businesses easily and flexibly in the conditions that customers do not change their mobile phones, just because the JAVA applications have incomparable cross-platform property. Therefore, besides the basic functions coming along with the mobile phones such as calls, short messages, multimedia messages, visual calls and streaming media players and so on, it is possible to download and install JAVA application programs via JAVA virtual machines to expand the functions of the mobile phones, for example, on-line games, mobile banking services, mobile-phone securities, navigation tools, on-line music, and so on, and thereby the capabilities of mobile phones are greatly improved.

As an application component on a mobile phone, it is inevitable for the JAVA virtual machine to run concurrently with other mobile phone applications (such as calls) and therefore the problems of foreground and background switch will be encountered, no matter whether the operating system in the mobile phone is a single-tasking operating system or a multi-tasking operating system, and whether the JAVA virtual machine is a single-tasking virtual machine or a multi-tasking virtual machine. For example, when a mobile phone user is playing a JAVA game or using a JAVA mobile-phone security service, and if there is an incoming call or an incoming visual call at this time, the JAVA application program is required to be switched to the background and the incoming call is required to be switched to the foreground because the priority of the call is very high; and after the call is over, the JAVA application program is also required to be switched to the foreground so as to run continuously. There are two traditional methods, but both of them have shortcomings: (1) all components of the JAVA virtual machine are suspended and the running JAVA application stops running when the JAVA virtual machine switches to the background; (2) the JAVA virtual machine does not carry out processing when the JAVA virtual machine switches to the background, and the JAVA application runs continuously.

However, there are shortcomings below with respect to the above two methods.

It is fatal for an online real-time application to use the method (1), which may influence user experience severely. As shown in FIG. 1, if a user is playing a JAVA game of multi-player networking, and the game is interrupted abnormally and cannot continues after the user has received a call; and even worse, when a user is using a mobile-phone security service or mobile banking service, all operations are interrupted after the user has received a call, and all operations need to be carried out again even if no error occurs to cause damages, and thereby the user experience is influenced severely.

It is fatal for a local application with a large number of resources required to use the method (2), which may result in that the local applications cannot be used normally under severe conditions. As shown in FIG. 2, if a JAVA application with a large number of resources required is running, for example, a complex game or a JAVA performance testing software, the CUP occupancy rate may reaches up to 90%. At this time, a visual call is incoming, the JAVA application still runs after the JAVA virtual machine switches to the background, and the CPU occupancy rate is not reduced effectively; and because the visual call requires a large number of resources (such as CPU), the effect of the visual call tends to become poor because the visual call does not obtain enough resources, and even the visual call is failed to be received under severe conditions.

Therefore, a more flexible and effective method must be used to handle with the condition that the JAVA virtual machine runs in the background.

SUMMARY OF THE INVENTION

The present invention is provided in view of the problems that the user experience may be lowered or the local applications cannot be used normally when the programs are switched between foreground and background by traditional methods in the related art. Therefore, the present invention provides a resource allocation method and a device for foreground switch of a J2ME application to solve at least one of the above problems.

According to one aspect of the present invention, a resource allocation method for foreground switch of a J2ME application is provided.

The resource allocation method for foreground switch of a J2ME (Java 2 Micro Edition) application according to the present invention comprises the steps of: a JAVA application program receiving a first message from a JAVA virtual machine when the JAVA application program switches to background from foreground, wherein the first message carries information indicating that the JAVA application program needs to release partial resources; the JAVA application program returning a first response message to the JAVA virtual machine so as to realize release of the resources, wherein the first response message carries information of resources to be released and/or information of resources to be reserved for restoring to an executing state.

According to another aspect of the present invention, a resource allocation device for foreground switch of a J2ME application is provided.

The resource allocation device for foreground switch of a J2ME (Java 2 Micro Edition) application comprises: a receiving unit, configured to receive a first message from a JAVA virtual machine when a JAVA application program switches to background from foreground, wherein the first message carries information indicating that the JAVA application program needs to release partial resources; and a sending unit, configured to return a first response message to the JAVA virtual machine so as to realize release of the resources, wherein the first response message carries information of resources to be released and/or information of resources to be reserved for restoring to an executing state.

By the present invention, when the JAVA virtual machine switches to background from foreground, the JAVA virtual machine releases the resources exclusively occupied by the JAVA application program and limits the consumption of system resources, such as the CPU thereof, so that the problems that the user experience may be lowered or the local applications cannot be used normally when the programs are switched between foreground and background by traditional methods in the related art are solved, and thereby the user experience can be improved and the local applications can be ensured to be used normally.

BRIEF DESCRIPTION OF THE DRAWINGS

The drawings illustrated herein provide a further understanding of the present invention and form a part of the present application, and the exemplary embodiments and the description thereof are used to explain the present invention without unduly limiting the scope of the present invention. In the drawings.

DETAILED DESCRIPTION OF EMBODIMENTS

The present invention will be described hereinafter in detail with reference to the drawings and in conjunction with embodiments. It needs to be noted that the embodiments of the present invention and the features of the embodiments can be combined with each other if there is no conflict.

Figure 1:
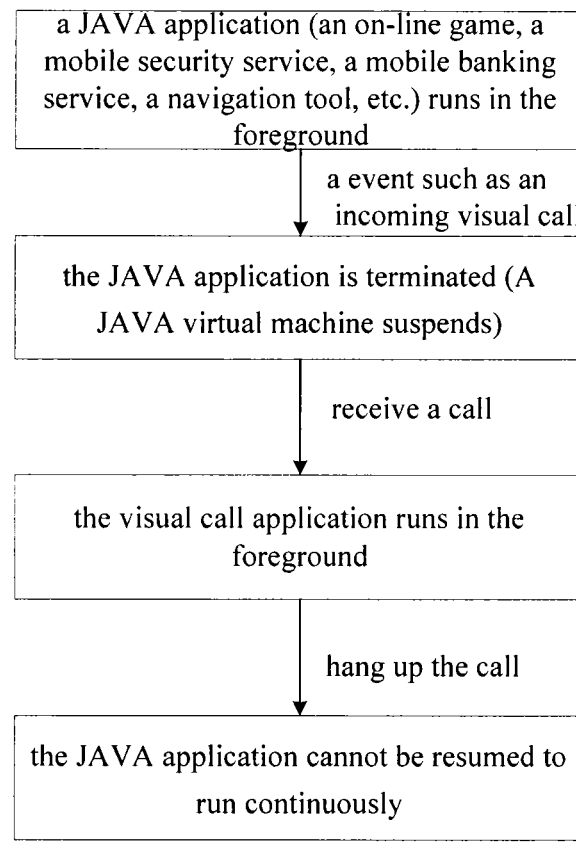
FIG. 1 is a flow chart of a foreground and background switch example implemented according to a first traditional method of the related art.
Figure 2:
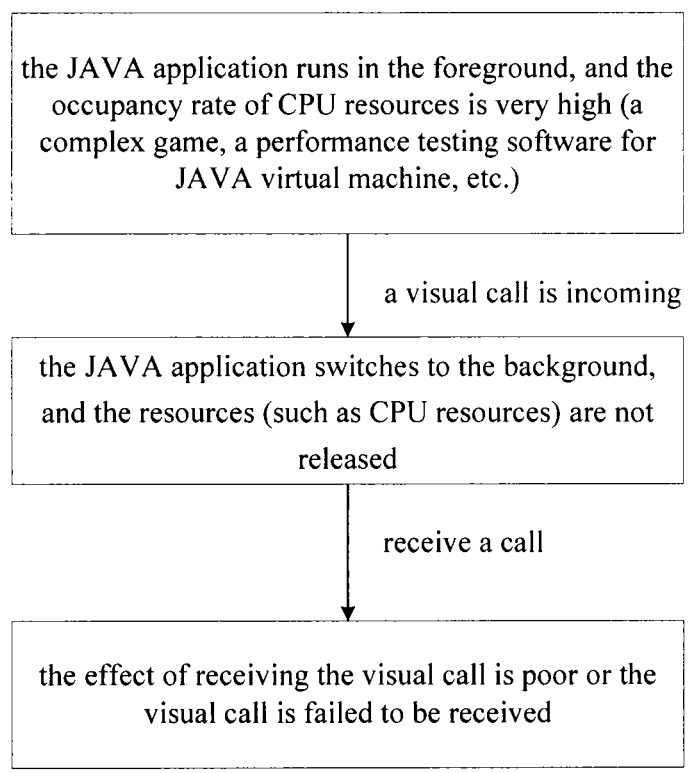
FIG. 2 is a flow chart of a foreground and background switch example implemented according to a second traditional method of the related art.
Figure 3:
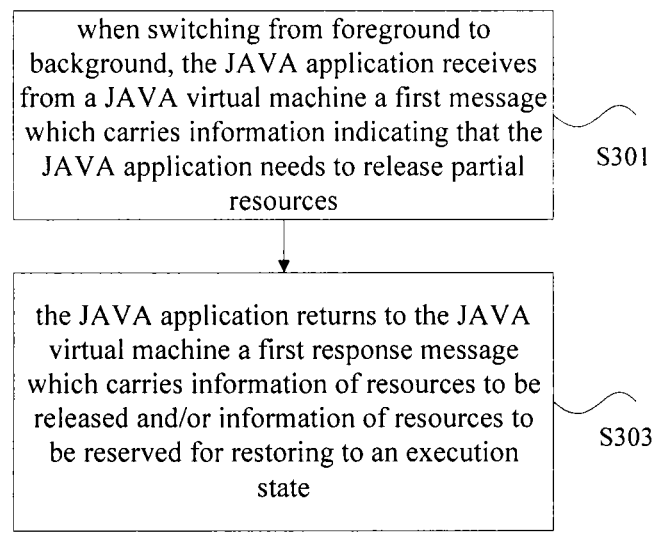
FIG. 3 is a flow chart of a resource allocation method for foreground switch of a J2ME application according to one embodiment of the present invention.

FIG. 3 is a flow chart of a resource allocation method for foreground switch of a J2ME application according to one embodiment of the present invention. As show in FIG. 3, the resource allocation method according to the embodiment of the present invention comprises the processing as follows (Step S301 to Step S303).

Step S301: a JAVA application program receives a first message from a JAVA application program when the JAVA application program switches to background from foreground, wherein the first message carries information indicating that the JAVA application program needs to release partial resources;

Step S303: The JAVA application program returns a first response message to the JAVA virtual machine so as to realize release of the resources, wherein the first response message carries information of resources to be released and/or information of resources to be reserved for restoring to an executing state.

By the embodiment, when the JAVA application program switches to the background from the foreground, only part of the resources are released, and the necessarily reserved resources for restoring to the execution state are reserved, which not only ensures the foreground application to run normally but also ensures the background application not to be interrupted, and to be able to resume running correctly in the future.

Preferably, the step S303 may further comprise the processing as follows.

(1) The JAVA virtual machine receives the first response message from the JAVA application program;

(2) The JAVA virtual machine releases the resources to be released according to the first response message.

Thus the JAVA virtual machine can release the resources to be released, for example, multimedia resources and part of CPU resources, according to the above processing.

Preferably, the JAVA virtual machine can release part of resources by means of resource scheduling, for example, the JAVA virtual machine releases CUP resources by entering into a sleep mode (for example, sleeps for 20 ms).

Preferably, the following scenarios may appear before the JAVA application program switches to the background from the foreground: (1) a JAVA execution program and a terminal application program run concurrently; (2) two JAVA execution programs run concurrently. That is to say, the above method is applicable for the scenarios that a JAVA execution program and a terminal application program run concurrently, and also applicable for the scenarios that two JAVA execution programs run concurrently.

Preferably, when the JAVA application program switches to foreground from background, may further comprises the following processing:

(1) the JAVA application program receives the second message from the JAVA virtual machine, wherein the second message carries the information indicating that the JAVA application program need to restore partial resources released;

(2) the JAVA application program returns the second response message to the JAVA virtual machine so as to realize the restore of the resources, wherein the second response message carries the information of the resources to be restored.

Preferably, the above implement in restoring the resources may further comprise the processing as follows.

(1) the JAVA virtual machine receives the second response message from the JAVA application program;

(2) the JAVA virtual machine restores the resources to be restored according to the second response message.

Preferably, the above necessarily reserved resources for restoring to the execution state comprises but not limits to: the necessary resources for maintaining network connection status.

Preferably, the part of the resources comprises at least one of the following resources: multimedia resources, CPU resources, wherein, the resources, such as the multimedia resources, occupied exclusively by the JAVA application program can be released entirely, and part of the CPU resources can be released so as to limit the CPU resources in a certain range (for example, 50%).

Preferably, restoring the multimedia resources by the JAVA application program comprises the processing as follows: acquiring the multimedia resources by the JAVA application program again.

During the practical implementation, as an application component of a mobile phone, the JAVA virtual machine itself is also an application program. The JAVA virtual machine obtains CPU resources by means of time slice scheduling, and obtains the storage resources and network resources, etc. by means of the API calls provided by an operating system. According to J2ME standard, the scheduling interval being able to reach 10 to 40 ms can be enough for the JAVA virtual machine to run; when switching to the background, the JAVA virtual machine can send a pause message (i.e. the above first message) to the JAVA application being running; when switching to the foreground, a resume message (i.e. the above second message) may be sent; and the JAVA application program may carry out corresponding processing when receiving the pause message or the resume message. Therefore, when the JAVA virtual machine switches to the background to run, the system resources (such as the CPU resources) occupied by the JAVA virtual machine will be limited within a certain range by the scheduling mechanism, instead of suspending all components of the JAVA virtual machine, which ensures other applications in the mobile phone to be able to obtain enough resources so as to run normally. Meanwhile, the JAVA application program needs to process the pause message and the resume message during switching, which ensures the application to be able to keep uninterrupted when switching to the background (such as network connection); and the application is able to resume normally and then run correctly when switching to the foreground.

Figure 4:
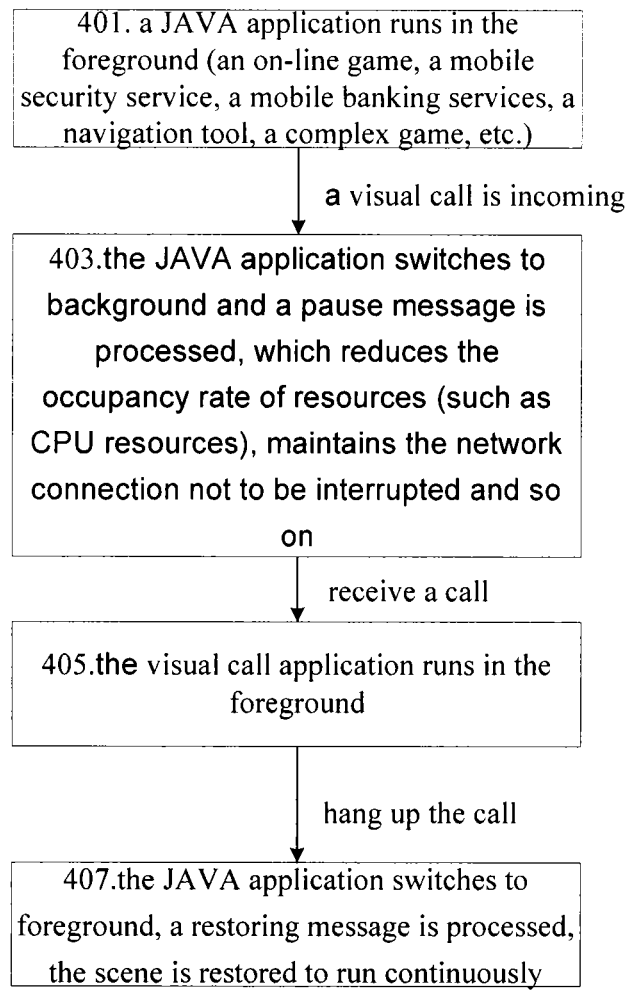
FIG. 4 is a flow chart of a foreground and background switch according to the resource allocation method of a preferred embodiment of the present invention.

FIG. 4 is a flow chart of a foreground and background switch according to the resource allocation method of a preferred embodiment of the present invention, which is illustrated by taking a complex foreground and background switch between an online JAVA game and a visual call description as an example. As shown in FIG. 4, the process comprises the processing as follows (Step S401 to Step S407).

Step S401: a JAVA game is operated. A complex online game requires the network to keep uninterrupted, and the CPU occupancy rate is very high.

Then, a visual call is incoming;

Step S403: a JAVA virtual machine switches to the background, a pause message sent the virtual machine is processed by a JAVA game, and the CPU occupancy is limited within a certain range (for example, not more than 50%) by means of resource scheduling; meanwhile, the exclusively occupied resources (such as multimedia resources) are selectively released according to requirements, and the necessary resources (such as those for network connection, etc.) for restoring execution will be kept; and the CPU resources occupied are reduced by means of resource scheduling. The specific implement can be seen in FIG. 5 and FIG. 6.

Figure 5:
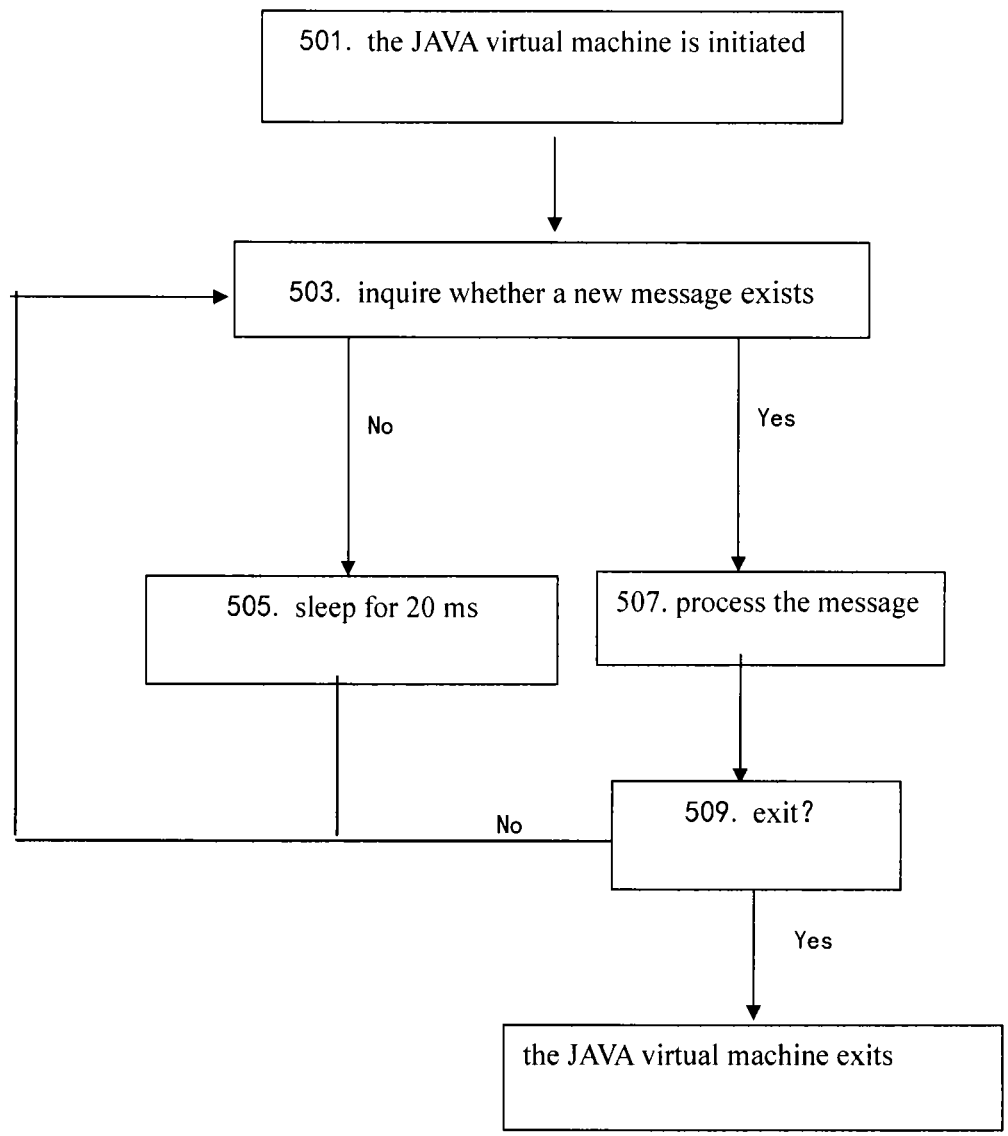
FIG. 5 is a flow chart of a message processing when performing a JAVA application program normally.

FIG. 5 is a flow chart of a message processing when performing a JAVA application program normally, wherein the JAVA application program supported by a JAVA virtual machine is in foreground, and as shown in FIG. 5, the process comprises the processing as follows (Step S501 to Step S509).

Step S501: the JAVA virtual machine is initiated;

Step S503: the JAVA virtual machine may inquire continually whether any new message exists (or events, EVENT);

Step S505: if new message does not exist, the JAVA virtual machine sleeps for certain time (for example, 20 ms) and releases the CPU resources, and then continues to perform the step S503; and if new message exists, the step S507 is performed;

Step S507: the JAVA virtual machine processes the messages (or events);

Step: S509: whether the JAVA virtual machine needs to exit is judged; if not, return to perform the step S503, otherwise, the JAVA virtual machine exits.

Figure 6:
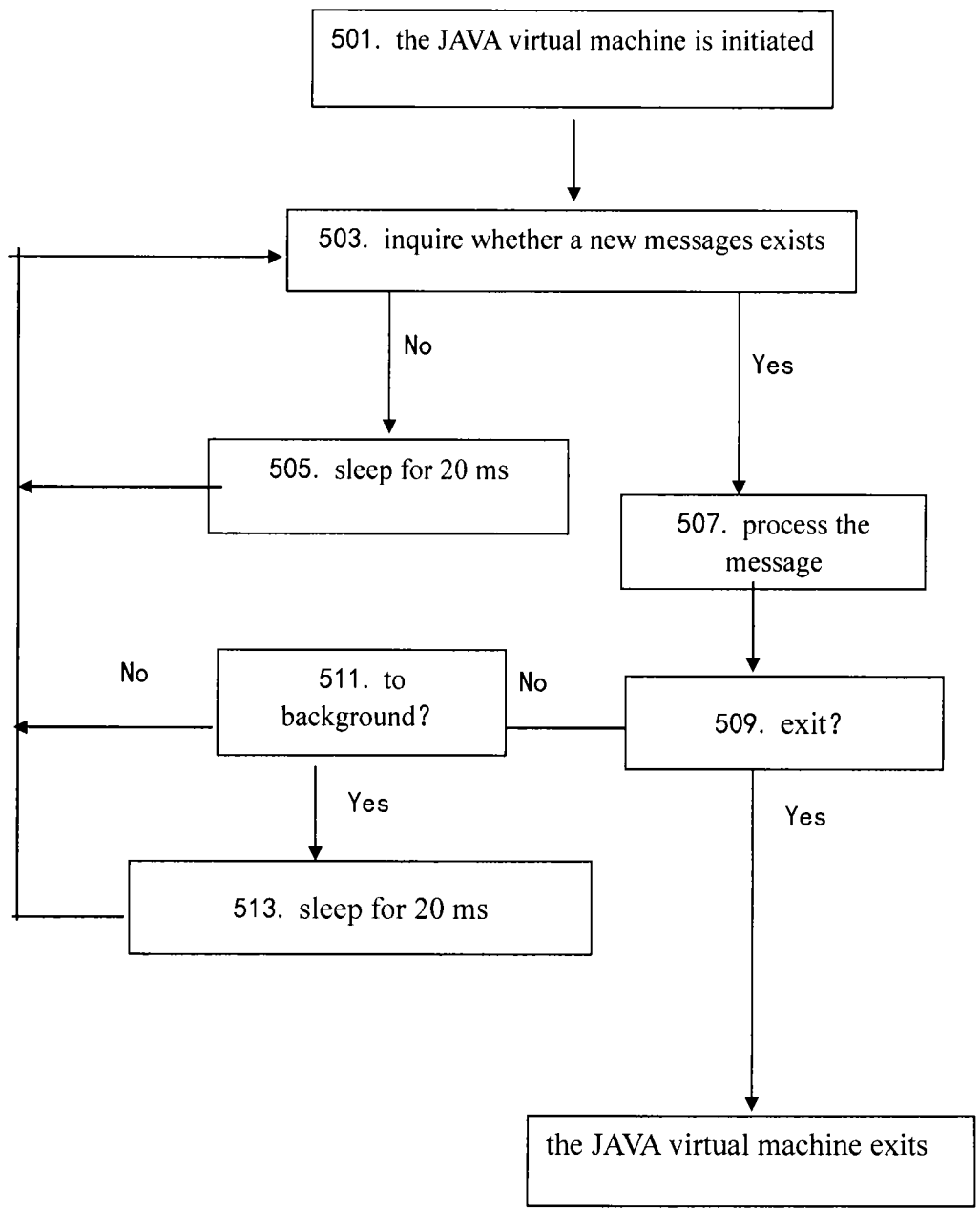
FIG. 6 is a flow chart of another message processing when performing a JAVA application program normally.

FIG. 6 is a flow chart of another message processing when performing a JAVA application program normally. Compared with FIG. 5, after the step S509 is performed, preferably, a step S511 can be added to judge whether it is required to switch the JAVA application program to the background; and when the JAVA application program switches to the background to run, after the message processing has been finished every time the step S513 is performed: sleeping for a certain time (for example, 20 ms) and releasing the CPU resources, and thereby the CPU occupancy rate may be reduced.

Similarly, the solutions of the related art are applicable for the release process of audio and video resources. According to the requirements under specific conditions, these audio and video resources are released when the JAVA application program switches to the background, and these audio and video resources are acquired again when being restored.

Step S405: the visual phone makes a call;

Step S407: after the call is over, the application for visual phone exits, the JAVA virtual machine switches to the foreground, the resume message is processed by the JAVA game, the required system resources of the game are restored (for example, the occupied CPU resources) and the game continues to run. For the resources occupied exclusively, such as multimedia output devices, if these resources have been released when the JAVA virtual machine switches to the background, these resources will be acquired again when the JAVA virtual machine switches to the foreground;

By the embodiment, when the JAVA application program switches to the background, the resource consumption thereof (such as CPU system resources, etc.) will be actively limited. Therefore, it can be ensured that other applications can obtain enough mobile phone resources to run normally; and meanwhile it can also be ensured that the JAVA application can switch to the foreground from the background smoothly when other applications are finished without termination or abnormal conditions occurring, and resume running correctly.

Figure 7:
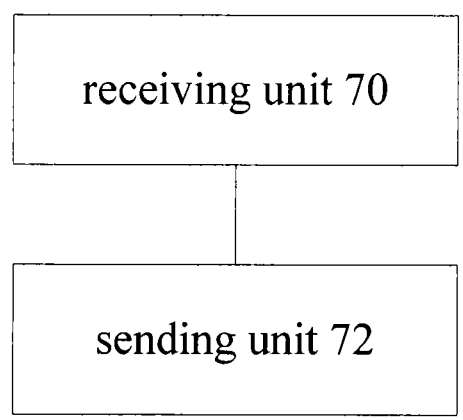
FIG. 7 is a structural block diagram of a resource allocation device for foreground switch of a J2ME application according to one embodiment of the present invention.
Figure 8:
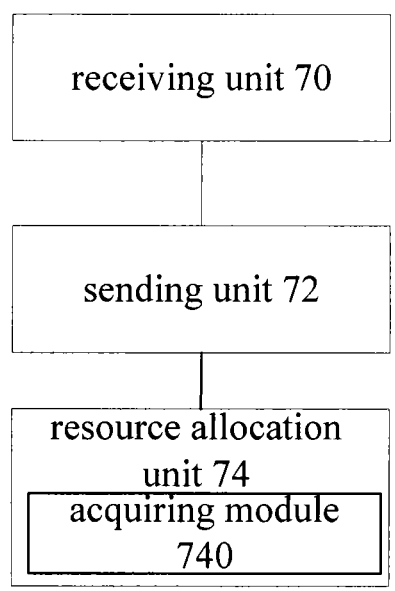
FIG. 8 is a structural block diagram of a resource allocation device for foreground switch of a J2ME application according to one preferred embodiment of the present invention.

FIG. 7 is a structural block diagram of a resource allocation device for foreground switch of a J2ME application according to one embodiment of the present invention. FIG. 8 is a structural block diagram of a resource allocation device for foreground switch of a J2ME application according to one preferred embodiment of the present invention. As shown in FIG. 7, the resource allocation device according to the embodiment of the present invention comprises: a receiving unit 70 and a sending unit 72.

The receiving unit 70 is configured to receive a first message from a JAVA virtual machine when a JAVA application program switches to background from foreground, wherein the first message carries information indicating that the JAVA application program needs to release partial resources.

The sending unit 72 is configured to return a first response message to the JAVA virtual machine so as to realize release of the resources, wherein the first response message carries information of resources to be released and/or information of resources to be reserved for restoring to an executing state.

By the device provided in the embodiment, when the JAVA application program switches to the background from the foreground, the device only releases part of the resources, and reserves necessarily reserved resources for restoring to the execution state, which not only ensures the foreground application to run normally but also ensures the background application not to be interrupted, and to be able to resume running correctly in the future.

Preferably, as shown in FIG. 8, the above device further comprises a resource allocation unit 74, configured to release the resources to be released according to the first response message.

Preferably, the receiving unit 70 is further configured to receive a second message from the JAVA virtual machine, wherein the second message carries information indicating that the JAVA application program needs to restore the partial resources released; and the sending unit 72 is further configured to return a second response message to the JAVA virtual machine so as to realize the restore of the resources, wherein the second response message carries information of resources to be restored.

Preferably, the resource allocation unit 74 is further configured to restore the resources to be restored according to the second response message.

Preferably, the resource allocation unit 74 comprises an acquiring module 740, configured to acquire multimedia resources again.

In summation, according to the above embodiments provided by the prevent invention, the concurrency issues between a JAVA application program and another mobile phone application program or the concurrency issues between two JAVA application programs can be solved. When the JAVA application program switches to background, another application program or another JAVA application program is ensured to obtain enough mobile phone resources so as to run normally; and meanwhile the JAVA application program is also ensured to switch to foreground from the background smoothly when another application program ends without termination or abnormal conditions occurring, and resume running correctly.

Apparently, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device, so that consequently they can be stored in the storing device and executed by the calculating device, or they are made into integrated circuit module respectively, or a plurality of modules or steps thereof are made into one integrated circuit module. In this way, the present invention is not limited to the combination of any particular hardware and software.

Above descriptions are only to illustrate the preferred embodiments but not to limit the present invention. Various alterations and changes to the present invention are apparent to those skilled in the art. Any amendments, equivalent substitutions, improvements, etc. within the spirit and principle of the present invention are all included in the scope of the protection of the present invention.

What is claimed is:

1. A resource allocation method for foreground switch of a JAVA 2 Platform Micro Edition (J2ME) application, comprising:
   when a JAVA application program is switching to background from foreground,
   receiving a first message from a JAVA virtual machine, wherein the first message carries information indicating that the JAVA application program needs to release partial resources; and
   the JAVA application program returning a first response message to the JAVA virtual machine; upon receiving the first response message, the JAVA virtual machine releasing the partial resources to be released, according to the first response message, wherein the first response message carries information indicating the partial resources to be released and resources to be necessarily reserved for restoring the JAVA application program to an executing state; wherein the partial resources comprises at least one of the resources of: multimedia resources, CPU resources; and
   when the JAVA application program switches to foreground from background, the method further comprises:
   the JAVA application program receives a second message from the JAVA virtual machine, wherein the second message carries the information indicating that the JAVA application program need to restore partial resources released;
   the JAVA application program returns a second response message to the JAVA virtual machine so as to realize the restore of the resources to be restored, wherein the second response message carries the information of the resources to be restored.

2. The method according to claim 1, wherein means of realizing the release of the resources comprises:
   a resource scheduling method.

3. The method according to claim 1, wherein before the JAVA application program switches from the foreground to the background, the method further comprises one of the steps of:
   a JAVA execution program and a terminal application program running concurrently; and
   two JAVA execution programs running concurrently.

4. The method according to claim 1, further comprising:
   when the JAVA application program is switching to the background from the foreground,
   receiving a second message from the JAVA virtual machine, wherein the second message carries the information indicating that the JAVA application program needs to restore partial resources released; and
   returning a second response message to the JAVA virtual machine, wherein the second response message carries information indicating resources to be restored.

5. The method according to claim 4, wherein realizing the restore of the resources comprises:

receiving the second response message, by the JAVA virtual machine, from the JAVA application program; and restoring the resources to be restored, according to the second response message, by the JAVA virtual machine.

6. The method according to claim 5, wherein the necessarily reserved resources for restoring to the execution state comprises:

necessary resources for maintaining network connection status.

7. The method according to claim 4, wherein the necessarily reserved resources for restoring to the execution state comprises:

necessary resources for maintaining network connection status.

8. The method according to claim 1, wherein restoring the multimedia resources comprises:

acquiring the multimedia resources again.

9. A resource allocation device for foreground switch of a JAVA 2 Platform Micro Edition (J2ME) application, the device comprising a memory storing receiving unit and sending unit; and a processor is configured to execute the receiving unit and the sending unit:

the receiving unit, configured to receive a first message from a JAVA virtual machine when a JAVA application program switches to background from foreground, wherein the first message carries information indicating that the JAVA application program needs to release partial resources; and the sending unit, configured to return a first response message to the JAVA virtual machine so as to cause the JAVA virtual machine, upon receiving the first response message, to release the partial resources to be released, according to the first response message, wherein the first response message carries information indicating resources to be released and resources to be reserved for restoring the JAVA application program to an executing state; wherein the partial resources comprises at least one of the resources of: multimedia resources, CPU resources; and when the JAVA application program switches to foreground from background, further comprises:

the JAVA application program receives a second message from the JAVA virtual machine, wherein the second message carries the information indicating that the JAVA application program need to restore partial resources released;

the JAVA application program returns a second response message to the JAVA virtual machine so as to realize the restore of the resources to be restored, wherein the second response message carries the information of the resources to be restored.

10. The device according to claim 9, the memory further storing a resource allocation unit, the processor is configured to execute the resource allocation unit:

the resource allocation unit, configured to release the resources to be released according to the first response message.

11. The device according to claim 10, wherein, the resource allocation unit is further configured to restore the resources to be restored, according to the second response message.

12. The device according to claim 11, wherein the resource allocation unit comprises:

an acquiring module, configured to acquire multimedia resources again.

13. The device according to claim 9, wherein, the receiving unit is further configured to receive a second message from the JAVA virtual machine, wherein the second message carries information indicating that the JAVA application program needs to restore the partial resources released; and the sending unit is further configured to return a second response message to the JAVA virtual machine so as to cause the JAVA virtual machine to realize restore of the resources, wherein the second response message carries information indicating resources to be restored.

14. A resource allocation device for foreground switch of a JAVA 2 Platform Micro Edition (J2ME) application, comprising at least one hardware processor configured to:

receive, from a JAVA application program, a first message from a JAVA virtual machine when the JAVA application program switches to background from foreground, wherein the first message carries information indicating that the JAVA application program needs to release partial resources; and return, by the JAVA application program, a first response message to the JAVA virtual machine so as to cause the JAVA virtual machine, upon receiving the first response message, to release the partial resources to be released, according to the first response message, wherein the first response message carries information of resources to be released and information of resources to be reserved for restoring the JAVA application program to an executing state; wherein the partial resources comprises at least one of the resources of: multimedia resources, CPU resources; and when the JAVA application program switches to foreground from background, further comprises:

the JAVA application program receives a second message from the JAVA virtual machine, wherein the second message carries the information indicating that the JAVA application program need to restore partial resources released;

the JAVA application program returns a second response message to the JAVA virtual machine so as to realize the restore of the resources to be restored, wherein the second response message carries the information of the resources to be restored.

15. The device according to claim 14, wherein the at least one hardware processor is further configured to:

release the resources to be released according to the first response message.

16. The device according to claim 14, wherein the at least one hardware processor is further configured to:

receive a second message from the JAVA virtual machine, wherein the second message carries information indicating that the JAVA application program needs to restore the partial resources released; and return a second response message to the JAVA virtual machine so as to cause the JAVA virtual machine to realize restore of the resources, wherein the second response message carries information of resources to be restored.

17. The device according to claim 16, wherein the at least one hardware processor is further configured to:

restore the resources to be restored, according to the second response message.

* * * * *